United States Patent
Yatabe et al.

(10) Patent No.: US 8,249,155 B2
(45) Date of Patent: Aug. 21, 2012

(54) TRANSCODER, RECORDER, AND TRANSCODING METHOD

(75) Inventors: Yusuke Yatabe, Yokohama (JP); Hironori Komi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/079,056

(22) Filed: Apr. 4, 2011

(65) Prior Publication Data

US 2011/0274171 A1 Nov. 10, 2011

Related U.S. Application Data

(63) Continuation of application No. 11/367,295, filed on Mar. 6, 2006, now Pat. No. 7,924,919.

(30) Foreign Application Priority Data

Oct. 4, 2005 (JP) ................................. 2005-290638

(51) Int. Cl.
*H04N 7/12* (2006.01)

(52) U.S. Cl. ......... 375/240.12; 375/240.01; 375/240.02; 375/240.1; 375/240.11; 375/240.13

(58) Field of Classification Search ............... 375/240.1, 375/240.12, 240.13, 240.14, 240.16, 240.01, 375/240.02, 240.03, 240.11
See application file for complete search history.

(56) References Cited

U.S. PATENT DOCUMENTS

| | | | |
|---|---|---|---|
| 5,453,790 A * | 9/1995 | Vermeulen et al. | 375/240.12 |
| 6,574,277 B1 * | 6/2003 | Miyamoto | 375/240.13 |
| 7,643,559 B2 | 1/2010 | Kato et al. | |
| 7,746,930 B2 | 6/2010 | Sato et al. | |
| 7,822,120 B2 * | 10/2010 | Kondo et al. | 375/240.16 |
| 7,843,996 B2 | 11/2010 | Chujoh et al. | |
| 7,869,515 B2 * | 1/2011 | Chujoh et al. | 375/240.14 |
| 7,970,223 B2 * | 6/2011 | Sugimoto et al. | 382/238 |
| 8,054,883 B2 * | 11/2011 | Filippini et al. | 375/240.16 |
| 2005/0058197 A1 | 3/2005 | Lu et al. | |
| 2005/0169377 A1 | 8/2005 | Lin et al. | |
| 2005/0254582 A1 | 11/2005 | Takahashi et al. | |
| 2006/0013299 A1 * | 1/2006 | Sato et al. | 375/240.03 |
| 2006/0140275 A1 * | 6/2006 | Lee et al. | 375/240.16 |
| 2006/0222075 A1 * | 10/2006 | Zhang et al. | 375/240.16 |
| 2007/0086523 A1 * | 4/2007 | Yan | 375/240.13 |
| 2007/0140348 A1 | 6/2007 | Koto et al. | |

* cited by examiner

*Primary Examiner* — Hirdepal Singh
(74) *Attorney, Agent, or Firm* — Antonelli, Terry, Stout & Kraus, LLP

(57) ABSTRACT

A transcoder for decoding a motion picture stream encoded by using a first coding scheme, which provides intraframe coding and interframe predictive coding, and encoding the decoded motion picture stream by using a second coding scheme, the transcoder including: at decoder for decoding an input motion picture stream and detecting sub-information indicating whether an intraframe coding scheme or an interframe predictive coding scheme is used; and an encoder for changing the frame to be referenced at the time of coding depending on whether the sub-information indicates the use of the intraframe coding scheme or the interframe predictive coding scheme.

14 Claims, 8 Drawing Sheets

TRANSCODER, RECORDER, AND TRANSCODING METHOD

CROSS REFERENCE TO RELATED APPLICATION

This is a continuation of U.S. application Ser. No. 11/367,295, filed Mar. 6, 2006 now U.S. Pat. No. 7,924,919. This application relates to and claims priority from Japanese Patent Application No. 2005-290638, filed on Oct. 4, 2005. The entirety of the contents and subject matter of all of the above is incorporated herein by reference.

BACKGROUND OF THE INVENTION

1. Field of the Invention

The present invention relates to a transcoder that is capable of subjecting a motion picture stream to bit rate conversion and format conversion.

2. Description of the Related Art

In general, a transcoding technology decodes an. unconverted motion picture stream, uses the resulting decoded image as an input image, and encodes the decoded image in a new format. A technology disclosed by Japanese Patent JP-A No. 23444/2004 relates to transcoding and reduces the processing load on the encoding side by using a vector, which is a motion search result obtained from an unconverted motion picture stream, as motion information among encoding information.

SUMMARY OF THE INVENTION

However, Japanese Patent JP-A No. 23444/2004, which is mentioned above, does not describe a transcoding operation that is performed by using information indicating whether frames are intraframe-coded or interframe-coded.

If the frames are interframe-coded, there is a correlation between a reference frame and the frame to be encoded. Therefore, the reference frame can be determined in accordance with the same relationship as an unconverted stream relationship.

If, on the other hand, the reference frame is determined in accordance with the same relationship as an unconverted stream relationship in a situation where the frames are intraframe-coded, compression cannot be achieved with high efficiency because there is an inadequate correlation between the reference frame and the frame to be encoded.

Further, if two frames are sequentially searched for in accordance with the same relationship as an unconverted stream relationship, an extra process needs to be performed. Therefore, this type of operation is not suitable for circuit scale reduction and power consumption reduction.

To solve the above problem, the present invention aims at providing an easy-to-use transcoder, recorder, and transcoding method for transcoding by using information indicating whether the encoded information attached to an unconverted stream is interframe-coded or intraframe-coded.

One aspect of the present invention is directed to a transcoder that decodes a motion picture stream encoded by using a first coding scheme, which provides intraframe coding and interframe predictive coding, and encodes the decoded motion picture stream by using a second coding scheme. The transcoder includes a decoder for decoding an input motion picture stream and detecting sub-information indicating whether an intraframe coding scheme or interframe predictive coding scheme is used; and an encoder for changing the frame to be referenced at the time of coding or changing the order of frame searching depending on whether the sub-information indicates the use of the intraframe coding scheme or interframe predictive coding scheme.

BRIEF DESCRIPTION OF THE DRAWINGS

Embodiments of the present invention will be described in detail based on the following figures, wherein.

DESCRIPTION OF THE PREFERRED EMBODIMENTS

An embodiment of the present invention will now be described on the assumption that MPEG2-to-H.264 conversion is to be effected. However, the present invention can also be applied to a case where intraframe coding and interframe predictive coding are performed and a motion picture stream compressed by using a coding scheme having information indicating whether the information about a frame is generated by intraframe- or interframe-coding the frame is to be transcoded. The applicable coding schemes are MPEG4, H.261, H.263, and SMPTE VC1 in addition to MPEG2 and H.264.

H.264 (ITE/ISO 14496-10/H.264AVC), for example, permits multi-frame motion compensation in which a reference frame for motion compensation can be arbitrarily selected from decoded frames.

Figure 1:
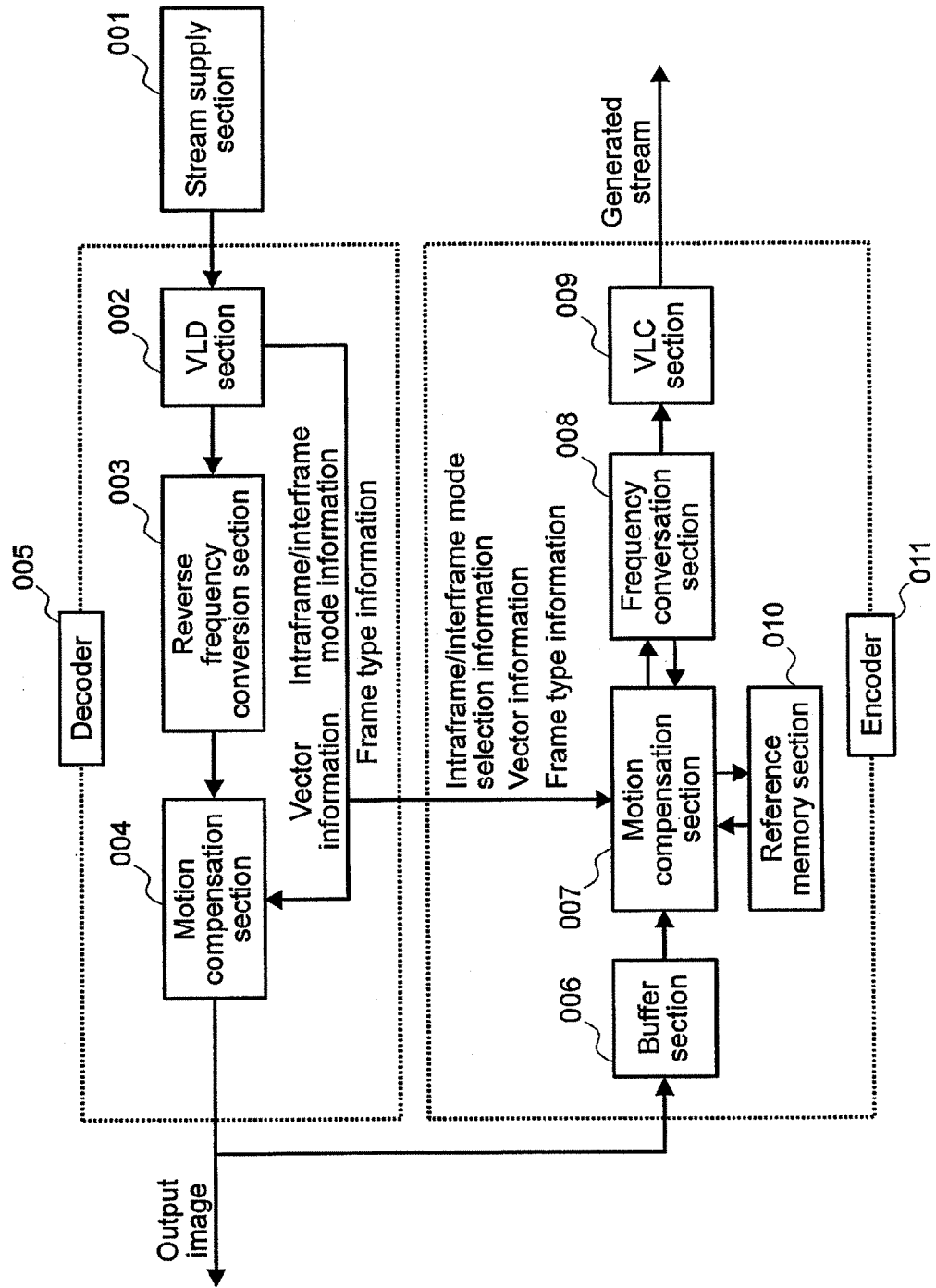
FIG. 1 is a block diagram illustrating a first embodiment of the present invention.

The configuration of an embodiment of the present invention will now be described with reference to FIG. 1. The upper half of the figure, represents a decoder (decoding device) 005. The decoder 005 includes a stream supply section 001 for supplying a digital motion picture stream read from a broadcast, recording medium, or the like; a VLD section 002 for deciphering a decoding syntax; a reverse frequency conversion section 003 for effecting frequency conversion region-to-image region conversion; and a motion compensation section 004 for making motion compensation from a reference image by using vector information decoded by the VLD section and creating a decoded image (output image) by adding the output from the reverse frequency conversion section.

The lower half of the figure represents an encoder (encoding device) 011. The encoder 011 includes a buffer section 006 for receiving an output image from the decoder and storing it in a buffer as an input image; a motion compensation section 007, which is capable of making motion compensation between the input image and a plurality of encoded reference images; a frequency conversion section 008 for subjecting a motion-compensated error image to frequency conversion; a VLC section 009 for performing encoding by using a syntax that complies with the requirements; and a reference memory section 010, which is a reference image storage section for using an encoded image as the reference image for later motion compensation.

The decoder decodes a frame header of each frame and performs a decoding process on each rectangular region called a macroblock (MB). In such an instance, the motion compensation section of the encoder can use an after-mentioned picture encoding type as well as vector information and intraframe/interframe information decoded on an individual MB basis.

The description of the present embodiment assumes that the above-mentioned decoder complies with MPEG2 (ISO/IEC 13813-2, International Standard), which is an international standard for motion picture encoding, and that the above-mentioned encoder complies with H.264 (ISO/IEC 14496-10/ITU H.264 AVC).

Figure 2:
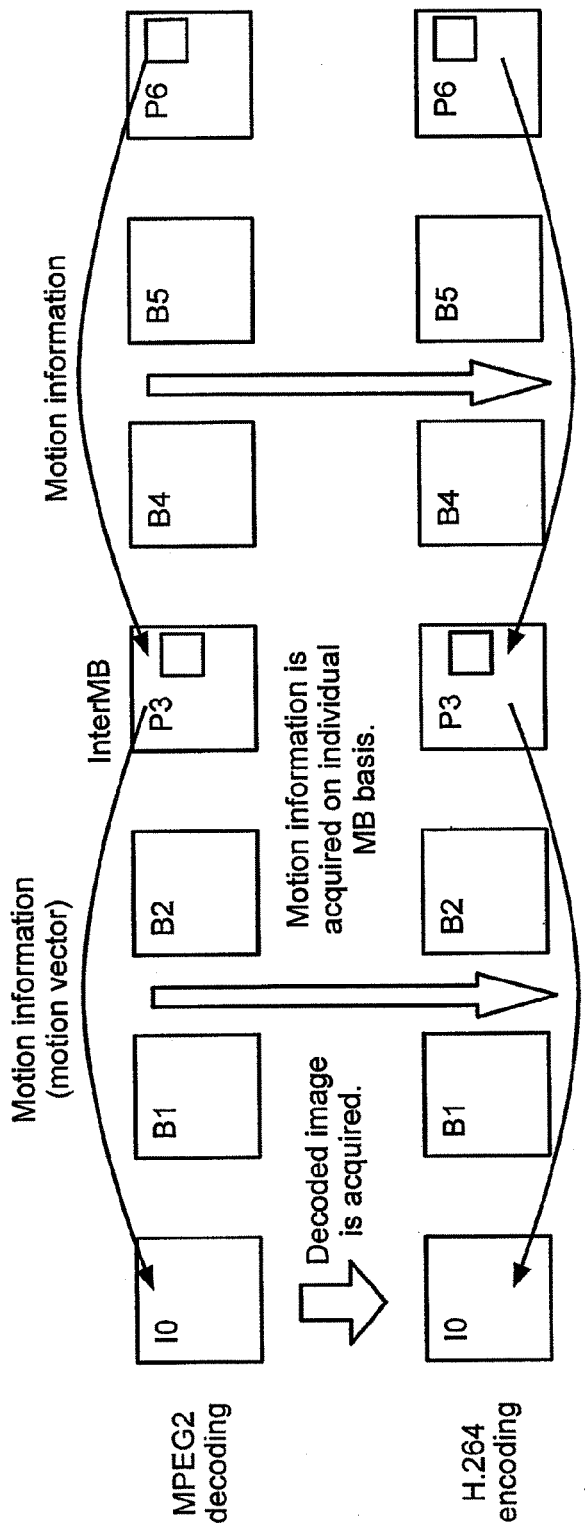
FIG. 2 is a conceptual diagram illustrating the first embodiment of the present invention.

FIG. 2 outlines the present embodiment. The upper half of the figure shows MPEG2 stream decoding prior to transcoding. The symbols I, B, and P represent a picture coding type. The symbol I denotes coding in which only the on-screen information is used (intra-coded). The symbol P denotes coding in which the past information is also available (predictive codec). The symbol B denotes coding in which the past information and future information are both available (bidirectionally predictive codec).

The lower half of the figure shows H.264 encoding. An MPEG2 decoded image is used as an input image for encoding. The coding type is the same as that for MPEG2, which is the conversion source.

When the configuration described above is employed, the vector information attached to MPEG2 can be used for H.264 encoding. When H.264 encoding is to be performed, the MPEG2 vector information corresponding to the MB targeted for coding is acquired and used. In this manner, the H.264 encoder can reduce the number of motion search circuits in which the calculation amount is large, thereby reducing the encoder's circuit scale.

Figure 3:
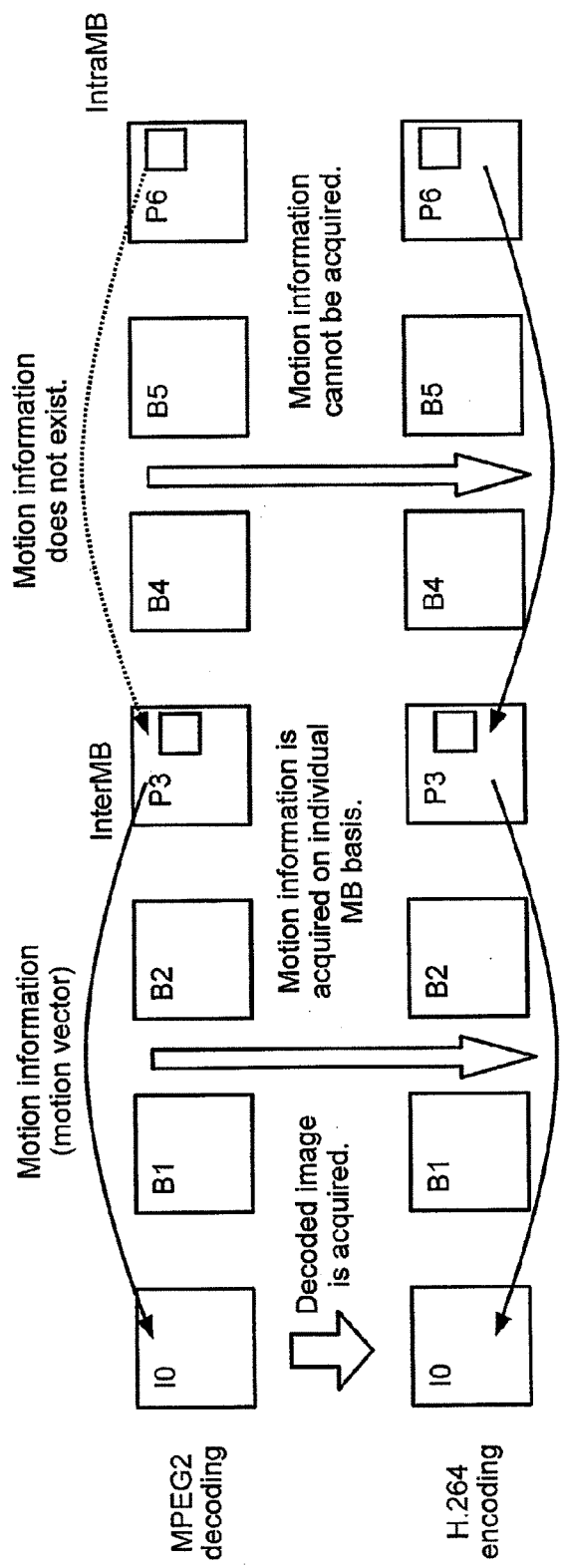
FIG. 3 is a conceptual diagram illustrating the first embodiment of the present invention.

When coding is performed in the intraframe mode in which the MPEG2 MB does not have vector information as indicated in FIG. 3, the H.264 encoder cannot acquire the vector information from MPEG2. In this instance, the H.264 encoder can also be placed in the intraframe mode. However, when the image quality is to be improved with the circuit scale and power consumption reduced, an effective method would be to newly conduct the following search.

As regards the MB of an MPEG2 stream for which the intraframe mode is selected, it is judged that there is an inadequate correlation to the reference image that is originally referenced by MPEG2. Thus, the H.264 encoder does not newly conduct a search on that reference frame.

Figure 8:
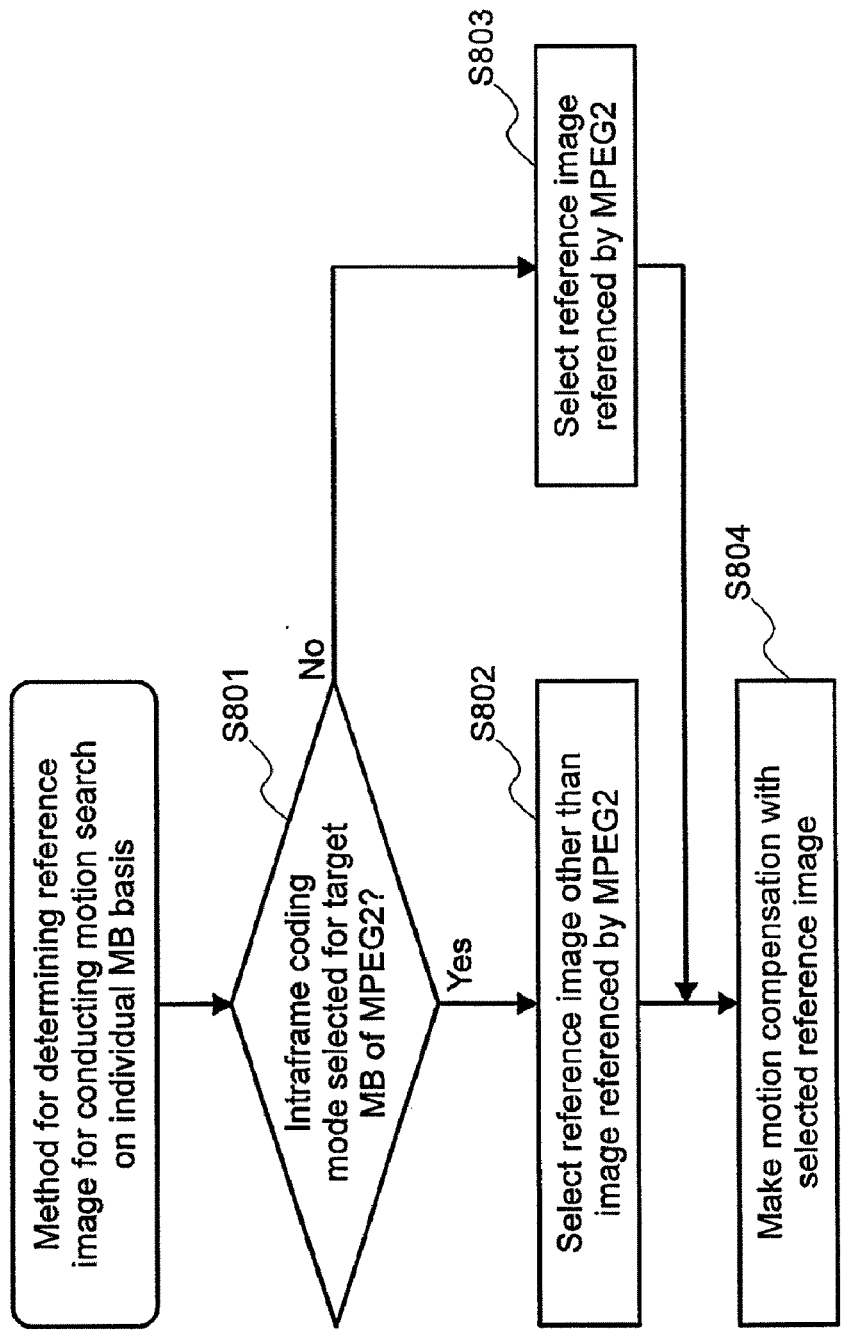
FIG. 8 is a flowchart illustrating a reference image selection sequence.

FIG. 8 is a flowchart illustrating a reference image selection sequence. When H.264 is to be used for encoding on an individual MB basis, step S801 is performed to reference information indicating whether the intraframe or interframe mode is used for each MPEG2 MB. When the intraframe mode is used, step S802 is performed to exclude the reference image referenced by MPEG2 from motion compensation by H.264, and select a reference image that is not referenced by MPEG2. Step S804 is then performed to make motion compensation with the selected reference image. When, on the other hand, the interframe mode is used, step S803 is performed to select a reference image that is referenced by MPEG2. Next, step S804 is performed to make H.264 motion compensation.

The method of selecting an efficient reference image by conducting a search on a plurality of reference images for the purpose of achieving multi-frame encoding in a low-power-consumption H.264 encoder LSI is nonfeasible because it enlarges the circuit scale and increases the power consumption. For circuit scale and power consumption reduction purposes, therefore, the H.264 encoder provides motion compensation for the same number of reference frames as is the case with MPEG2, which is a conventional technology. As regards the present embodiment, reference images providing inadequate correlation, for which the intraframe mode is selected, should be excluded from referencing for increased efficiency.

Figure 4:
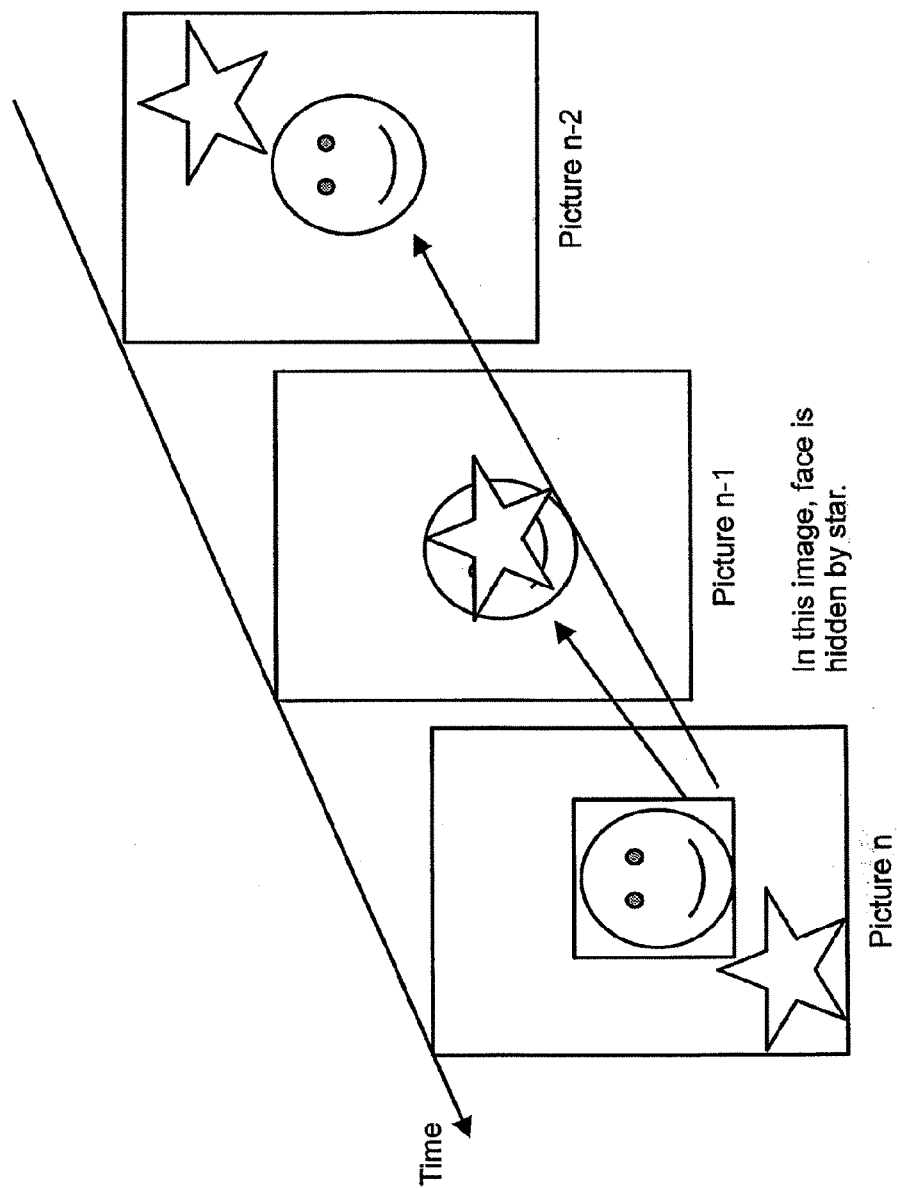
FIG. 4 illustrates a typical uncovered area.

Further, when the intraframe mode is selected for MPEG2, it is conceivable that an uncovered area may be encountered as indicated in FIG. 4. This phenomenon occurs when a hidden area appears. Since the newly visible area is not contained in a reference image, the degree of time correlation decreases. In FIG. 4, a star moves from the upper right corner to the lower left corner. If picture n references picture n-1 when a face appears, the degree of correlation decreases. In picture n-2, which is a preceding past image, however, it is possible that an increased degree of correlation may be provided. When MPEG2 is in the intraframe mode, the present embodiment selects the preceding past image as a reference image with a view toward encountering an increased degree of correlation.

Figure 5:
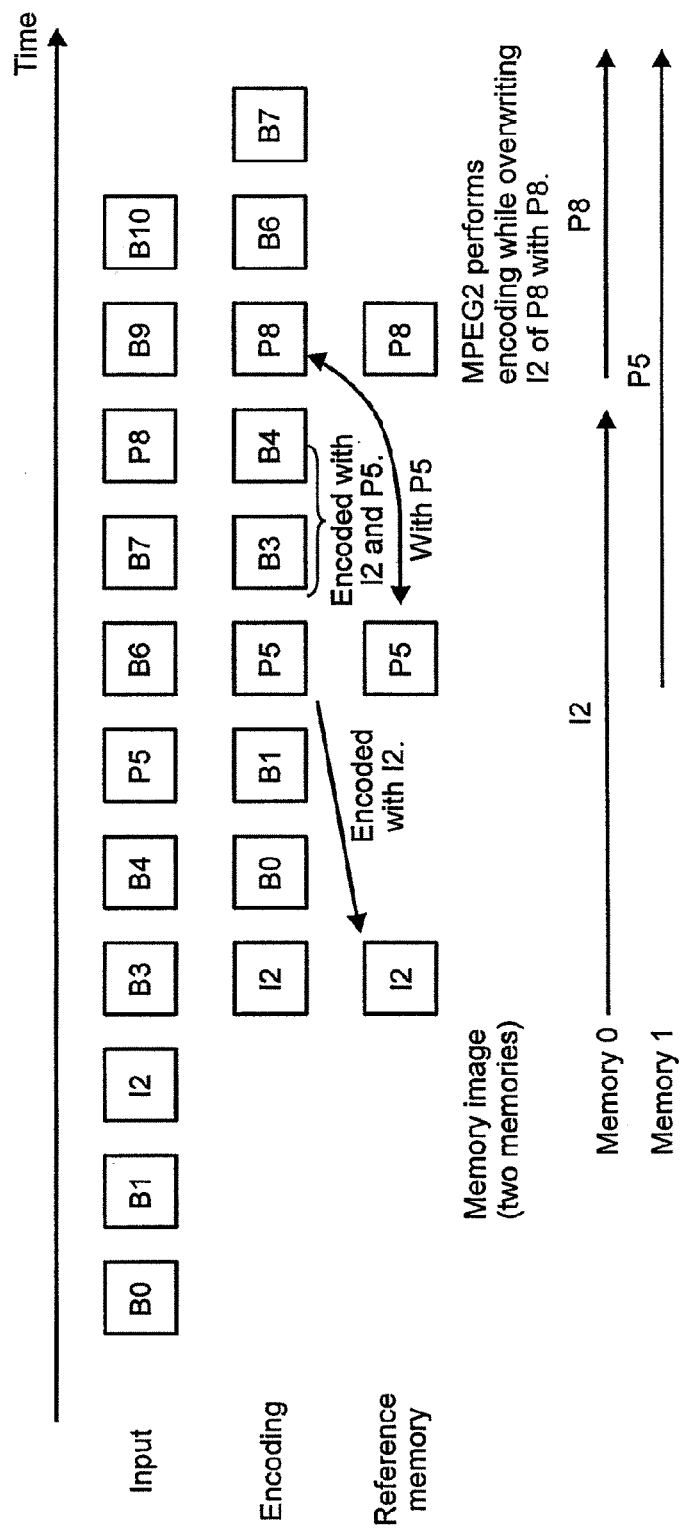
FIG. 5 illustrates a typical reference memory configuration.
Figure 6:
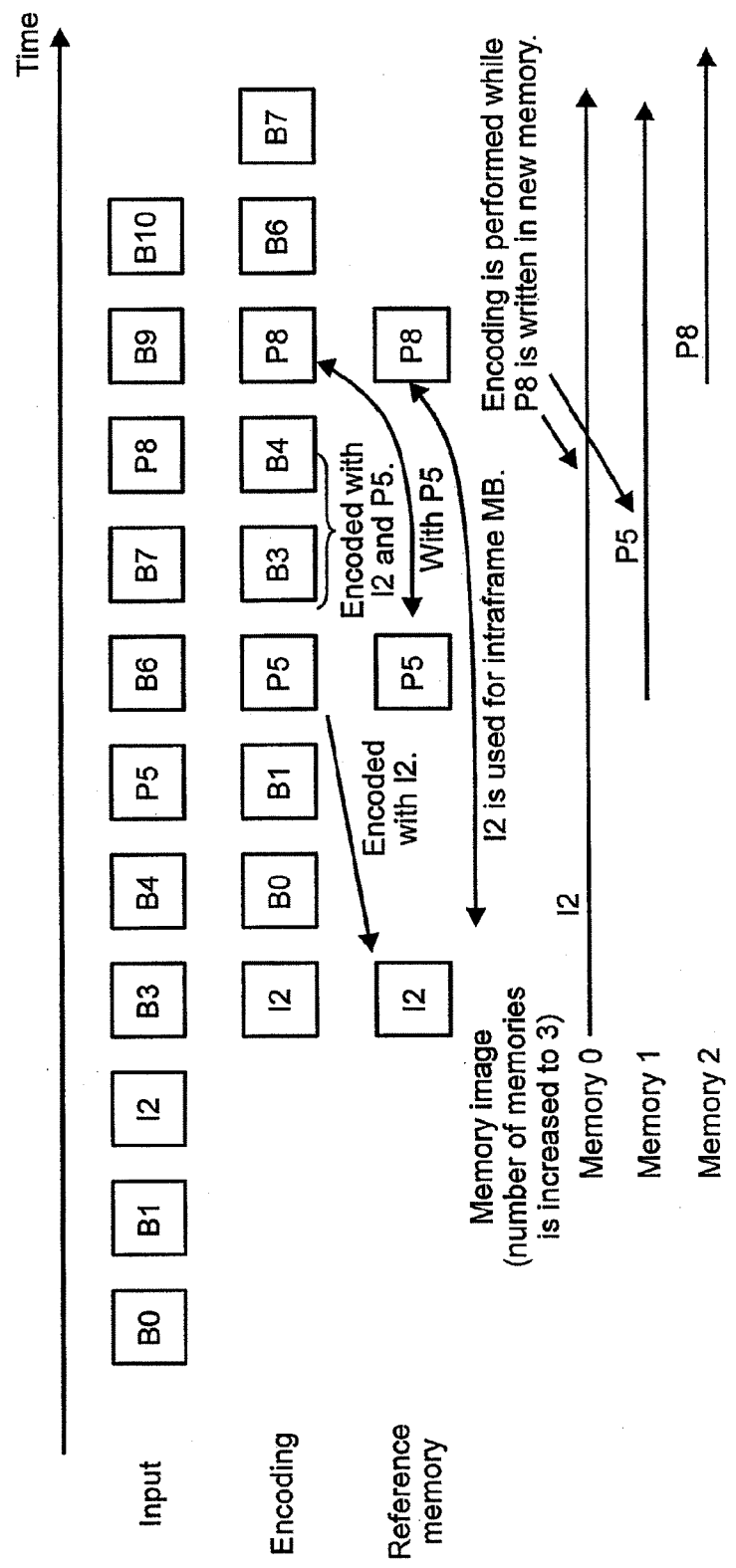
FIG. 6 illustrates a typical reference memory configuration.

An example of the above-mentioned reference image is described below. In encoding, a coded image is used later as a reference image as indicated in FIG. 5. Therefore, the coded image needs to be stored in a reference memory. When the referencing relationship is the same as for MPEG2, two reference memories are used. The images stored in the two reference memories are used for encoding purposes. The present embodiment increases the number of memories by one to increase the number of reference images as indicated in FIG. 6. When the motion compensation information is not obtained in the intraframe mode, the present embodiment performs referencing from the I2 frame, which is stored in a memory due to an increase in the number of memories.

In a situation where the number of memories is increased by one as mentioned above, any completely decoded frames can be stored in a memory area and referenced. In such a situation, the first frame of a certain encoding unit (e.g., GOP) may be stored and targeted for referencing. When the number of memories is further increased, the number of reference candidates can be increased. From the viewpoint of circuit scale reduction, however, it is preferred that the reference memory section include three memories as indicated in FIG. 6.

When the uncovered area is considered, the search range on the reference image need not always be broad. The search range may comprise several surrounding relevant pixels.

When the present embodiment is used to remove reference images that provide inadequate correlation, multi-encoding effects can be produced with the circuit scale and power consumption reduced.

Figure 7:
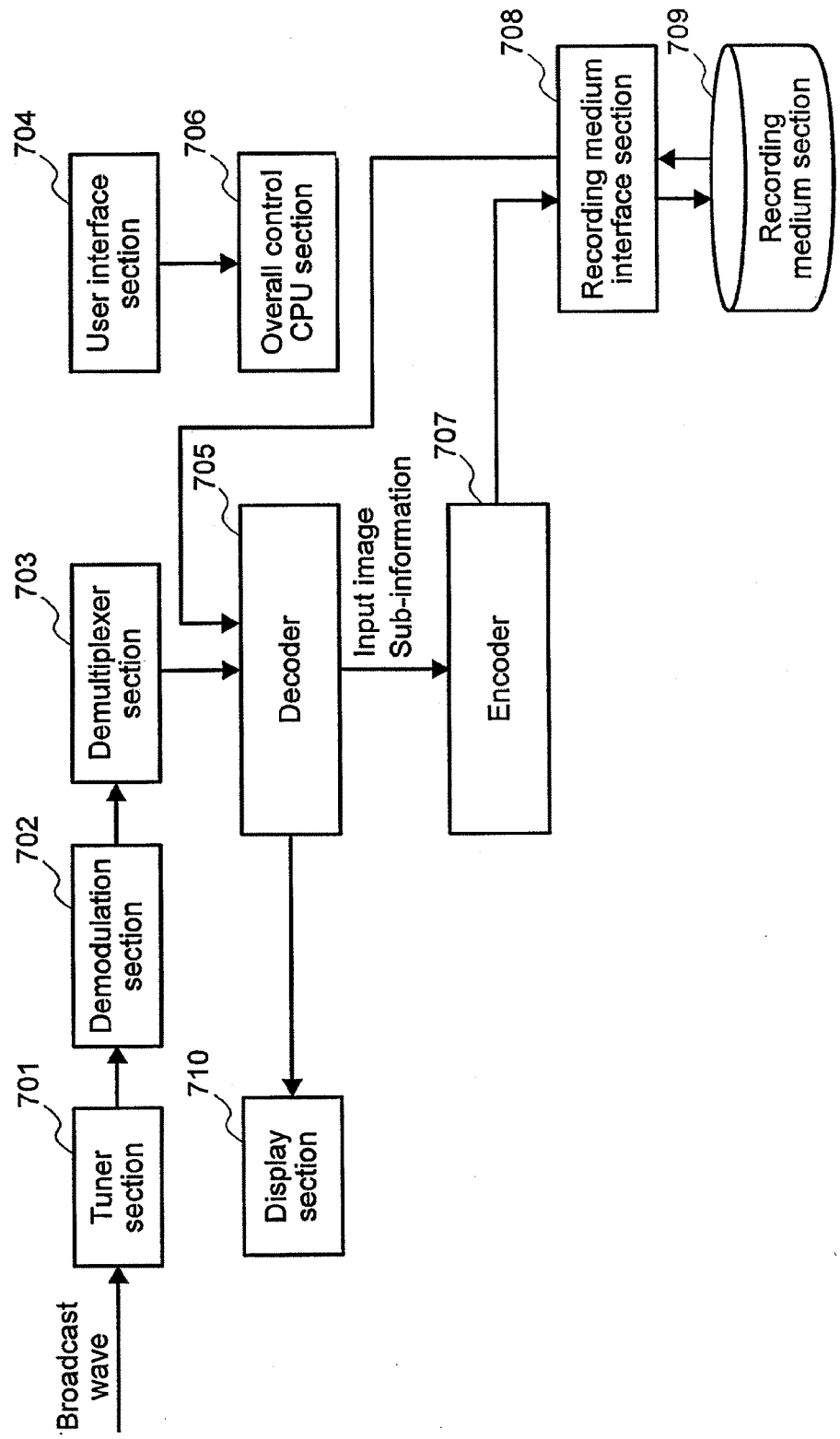
FIG. 7 shows an example of a product to which the first embodiment of the present invention is applied.

A typical product to which the present embodiment can be applied will now be described. The present embodiment is applicable to a situation where an analog or digital television broadcast or a prerecorded broadcast program is to be saved on a hard disk, DVD, or other recording medium with the coding format and coding rate changed. FIG. 7 is a block diagram illustrating a process that is performed to save a digital broadcast on a recording medium. A digital broadcast that is received by a tuner section 701 is forwarded to a demodulation section 702. The demodulation section 702 performs a decoding process on the digital broadcast. Next, a demultiplexer section 703 separates the digital broadcast into motion picture information, audio information, and the like. The motion picture information is decoded by a decoder 705. When an image is to be output to a display, the decoded image is forwarded to a display section 710. An encoder acquires a playback image and sub-information, which are decoded by the decoder, and performs a coding process to generate a stream.

The embodiment described above ensures that high quality is achieved when a motion picture is subjected to bit rate conversion or format conversion.

The foregoing invention has been described in terms of preferred embodiments. However, those skilled in the art will recognize that many variations of such embodiments exist. Such variations are intended to be within the scope of the present invention and the appended claims.

What is claimed is:

1. A picture processing apparatus for decoding a motion picture stream encoded by using a first coding scheme, which provides intraframe coding and interframe predictive coding, and encoding the decoded motion picture stream by using a second coding scheme, the picture processing apparatus comprising:

an input unit to which the motion picture stream is inputted, the motion picture stream including a first frame which is encoded by the first coding scheme while switching between the intraframe coding scheme and the interframe predictive coding scheme for each predetermined region and sub-information for each said predetermined region indicating whether the intraframe coding scheme or the interframe predictive coding scheme is used, a transcoder for decoding the input motion picture stream which is encoded by using the first coding scheme, and encoding the decoded input motion picture stream by using the second coding scheme, and an output unit for outputting the encoded input motion picture stream which is encoded by using the second coding scheme;

wherein a predetermined region of the first frame of the output motion picture stream which is indicated by the sub-information as being encoded by the interframe predictive coding scheme is encoded by using the second coding scheme to reference an image of a corresponding predetermined region of a frame being referenced when the first coding scheme is performed, and other predetermined region of the first frame of the output motion picture stream which is indicated by the sub-information as being encoded by the intraframe coding scheme is encoded by using the second coding scheme to reference an image of a corresponding predetermined region of other frame which is different from the frame being referenced when the first coding scheme is performed.

2. A picture processing apparatus for decoding a motion picture stream encoded by using a first coding scheme, which provides intraframe coding and interframe predictive coding, and encoding the decoded motion picture stream by using a second coding scheme, the picture processing apparatus comprising:

an input unit to which the motion picture stream is inputted, the motion picture stream including a first frame which is encoded by the first coding scheme to reference a second frame as a reference frame while switching between the intraframe coding scheme and the interframe predictive coding scheme for each predetermined region and sub-information for each said predetermined region indicating whether the intraframe coding scheme or the interframe predictive coding scheme is used, a transcoder for decoding the input motion picture stream which is encoded by using the first coding scheme, and encoding the decoded input motion picture stream by using the second coding scheme, and an output unit for outputting the encoded input motion picture stream which is encoded by using the second coding scheme;

wherein a predetermined region of the first frame of the output motion picture stream which is indicated by the sub-information as being encoded by the interframe predictive coding scheme is encoded by using the second coding scheme to reference an image of a corresponding predetermined region of the second frame, and other predetermined region of the first frame of the output motion picture stream which is indicated by the sub-information as being encoded by the intraframe coding scheme is encoded by using the second coding scheme to reference an image of a corresponding predetermined region of other frame which is different from the second frame.

3. A picture processing apparatus for decoding a motion picture stream encoded by using a first coding scheme, which provides intraframe coding and interframe predictive coding, and encoding the decoded motion picture stream by using a second coding scheme, the picture processing apparatus comprising:

an input unit to which the motion picture stream is inputted, the motion picture stream including a second frame which is encoded by the first coding scheme to reference a third frame as a reference frame, a first frame which is encoded by the first coding scheme to reference the second frame as a reference frame while switching between the intraframe coding scheme and the interframe predictive coding scheme for each predetermined region, and sub-information for each said predetermined region indicating whether the intraframe coding scheme or the interframe predictive coding scheme is used, a transcoder for decoding the input motion picture stream which is encoded by using the first coding scheme, and encoding the decoded input motion picture stream by using the second coding scheme, and an output unit for outputting the encoded input motion picture stream which is encoded by using the second coding scheme;

wherein a predetermined region of the first frame of the output motion picture stream which is indicated by the sub-information as being encoded by the interframe predictive coding scheme is encoded by using the second coding scheme to reference an image of a corresponding predetermined region of the second frame, and other predetermined region of the first frame of the output motion picture stream which is indicated by the sub-information as being encoded by the intraframe coding scheme is encoded by using the second coding scheme to reference an image of a corresponding predetermined region of the third frame.

4. The picture processing apparatus according to claim 3, wherein, when the predetermined region of the first frame of the input motion picture stream is indicated by the sub-information as being encoded by the intraframe coding scheme, the transcoder is encoded by using the second coding scheme without referencing the second frame.

5. The picture processing apparatus according to claim 3, wherein:

the third frame is an interframe-encoded I picture, the second frame is a P picture which is interframe-predictive-coded by referencing the third frame, and the first frame is a P picture which is interframe-predictive-coded by referencing the second frame.

6. The picture processing apparatus according to claim 3, wherein the predetermined region is a macroblock.

7. The picture processing apparatus according to claim 3, wherein the first coding scheme is an MPEG method, and wherein the second coding scheme is an H.264 method.

8. A picture processing method for decoding a motion picture stream encoded by using a first coding scheme, which provides intraframe coding and interframe predictive coding, and for encoding the decoded motion picture stream by using a second coding scheme, the picture processing method comprising:

accepting input of the motion picture stream, the motion picture stream including a first frame which is encoded by the first coding scheme while switching between the intraframe coding scheme and the interframe predictive coding scheme for each predetermined region and sub-information for each said predetermined region indicating whether the intraframe coding scheme or the interframe predictive coding scheme is used, decoding, via a transcoder, the input motion picture stream which is encoded by using the first coding scheme, and encoding the decoded input motion picture stream by using the second coding scheme, and outputting the encoded input motion picture stream which is encoded by using the second coding scheme;

wherein a predetermined region of the first frame of the output motion picture stream which is indicated by the sub-information as being encoded by the interframe predictive coding scheme is encoded by using the second coding scheme to reference an image of a corresponding predetermined region of a frame being referenced when the first coding scheme is performed, and other predetermined region of the first frame of the output motion picture stream which is indicated by the sub-information as being encoded by the intraframe coding scheme is encoded by using the second coding scheme to reference an image of a corresponding predetermined region of other frame which is different from the frame being referenced when the first coding scheme is performed.

9. A picture processing method for decoding a motion picture stream encoded by using a first coding scheme, which provides intraframe coding and interframe predictive coding, and for encoding the decoded motion picture stream by using a second coding scheme, the picture processing method comprising:

accepting input of the motion picture stream, the motion picture stream including a first frame which is encoded by the first coding scheme to reference a second frame as a reference frame while switching between the intraframe coding scheme and the interframe predictive coding scheme for each predetermined region and sub-information for each said predetermined region indicating whether the intraframe coding scheme or the interframe predictive coding scheme is used, decoding, via a transcoder, the input motion picture stream which is encoded by using the first coding scheme, and encoding the decoded input motion picture stream by using the second coding scheme, and outputting the encoded input motion picture stream which is encoded by using the second coding scheme;

wherein a predetermined region of the first frame of the output motion picture stream which is indicated by the sub-information as being encoded by the interframe predictive coding scheme is encoded by using the second coding scheme to reference an image of a corresponding predetermined region of the second frame, and other predetermined region of the first frame of the output motion picture stream which is indicated by the sub-information as being encoded by the intraframe coding scheme is encoded by using the second coding scheme to reference an image of a corresponding predetermined region of other frame which is different from the second frame.

10. A picture processing method for decoding a motion picture stream encoded by using a first coding scheme, which provides intraframe coding and interframe predictive coding, and for encoding the decoded motion picture stream by using a second coding scheme, the picture processing method comprising:

accepting input of the motion picture stream, the motion picture stream including a second frame which is encoded by the first coding scheme to reference a third frame as a reference frame, a first frame which is encoded by the first coding scheme to reference the second frame as a reference frame while switching between the intraframe coding scheme and the interframe predictive coding scheme for each predetermined region, and sub-information for each said predetermined region indicating whether the intraframe coding scheme or the interframe predictive coding scheme is used, decoding, via a transcoder, the input motion picture stream which is encoded by using the first coding scheme, and encoding the decoded input motion picture stream by using the second coding scheme, and an output unit for outputting the encoded input motion picture stream which is encoded by using the second coding scheme;

wherein a predetermined region of the first frame of the output motion picture stream which is indicated by the sub-information as being encoded by the interframe predictive coding scheme is encoded by using the second coding scheme to reference an image of a corresponding predetermined region of the second frame, and other predetermined region of the first frame of the output motion picture stream which is indicated by the sub-information as being encoded by the intraframe coding scheme is encoded by using the second coding scheme to reference an image of a corresponding predetermined region of the third frame.

11. The picture processing method according to claim 10, wherein, when the predetermined region of the first frame of the input motion picture stream is indicated by the sub-information as being encoded by the intraframe coding scheme, the transcoder is encoded by using the second coding scheme without referencing the second frame.

12. The picture processing method according to claim 10, wherein:

the third frame is an interframe-encoded I picture, the second frame is a P picture which is interframe-predictive-coded by referencing the third frame, and the first frame is a P picture which is interframe-predictive-coded by referencing the second frame.

13. The picture processing method according to claim 10, wherein the predetermined region is a macroblock.

14. The picture processing method according to claim 10, wherein the first coding scheme is an MPEG method, and wherein the second coding scheme is an H.264 method.

* * * * *